US012211251B2

(12) United States Patent
Stahlfeld (10) Patent No.: US 12,211,251 B2
(45) Date of Patent: Jan. 28, 2025

(54) IMAGE TRANSLATION FOR IMAGE RECOGNITION TO COMPENSATE FOR SOURCE IMAGE REGIONAL DIFFERENCES

(71) Applicant: X Development LLC, Mountain View, CA (US)

(72) Inventor: Phillip Ellsworth Stahlfeld, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 18/210,352

(22) Filed: Jun. 15, 2023

(65) Prior Publication Data

US 2023/0326180 A1  Oct. 12, 2023

Related U.S. Application Data

(63) Continuation of application No. 17/458,095, filed on Aug. 26, 2021, now Pat. No. 11,721,088, which is a continuation of application No. 16/666,304, filed on Oct. 28, 2019, now Pat. No. 11,126,843.

(51) Int. Cl.

| G06F 17/15 | (2006.01) |
| G06N 3/045 | (2023.01) |
| G06V 10/764 | (2022.01) |
| G06V 10/82 | (2022.01) |
| G06V 20/13 | (2022.01) |
| G06V 20/17 | (2022.01) |
| G06V 20/52 | (2022.01) |

(52) U.S. Cl.
CPC ............ *G06V 10/764* (2022.01); *G06F 17/15* (2013.01); *G06N 3/045* (2023.01); *G06V 10/82* (2022.01); *G06V 20/13* (2022.01); *G06V 20/17* (2022.01); *G06V 20/52* (2022.01)

(58) Field of Classification Search
CPC .. G06K 9/00624; G06N 3/0454; G06F 17/01; G06F 17/15
See application file for complete search history.

(56) References Cited

U.S. PATENT DOCUMENTS

| 7,860,702 B1 | 12/2010 | Evans et al. |
| 11,126,843 B2 | 9/2021 | Stahlfeld |
| 11,721,088 B2 | 8/2023 | Stahlfeld |

(Continued)

OTHER PUBLICATIONS

Nguyen, "Automatic autonomous vision-based power line inspection: A review of current status and the potential role of deep learning", Electrical Power and Energy Systems 99 (2018) 107-120, pp. 109-117.*

(Continued)

*Primary Examiner* — Omar S Ismail
(74) *Attorney, Agent, or Firm* — Fish & Richardson P.C.

(57) ABSTRACT

Methods, systems, and apparatus, including computer programs encoded on computer storage media, for predicting locations of utility assets. One of the methods includes receiving an input image of an area in a first geographical region; generating, from the input image and using a generative adversarial network, a corresponding reference image; and generating, by an object detection model and from the reference image, an output that identifies respective locations of one or more utility assets with reference to the input image.

20 Claims, 7 Drawing Sheets

(56) References Cited

U.S. PATENT DOCUMENTS

| | | | |
|---|---|---|---|
| 2016/0037356 A1* | 2/2016 | Bathula | H04W 16/18 |
| | | | 455/446 |
| 2016/0343093 A1* | 11/2016 | Riland | G06Q 50/06 |
| 2017/0061249 A1* | 3/2017 | Estrada | G06V 10/454 |
| 2017/0061625 A1* | 3/2017 | Estrada | G06N 3/04 |
| 2017/0364733 A1* | 12/2017 | Estrada | G06V 20/13 |
| 2018/0240194 A1* | 8/2018 | Dong | G06Q 30/0185 |
| 2018/0260956 A1* | 9/2018 | Huang | G06V 20/56 |
| 2018/0321928 A1* | 11/2018 | Borthakur | G06F 21/105 |
| 2019/0028909 A1* | 1/2019 | Mermoud | H04W 16/18 |
| 2019/0147372 A1* | 5/2019 | Luo | G06N 20/00 |
| | | | 706/20 |
| 2019/0207822 A1* | 7/2019 | Di Pietro | H04L 41/20 |
| 2019/0311298 A1* | 10/2019 | Kopp | G01C 25/00 |
| 2019/0370666 A1* | 12/2019 | Ros Sanchez | G06N 3/088 |
| 2020/0334524 A1* | 10/2020 | Sprague | H04L 67/12 |
| 2020/0410288 A1* | 12/2020 | Capota | G06F 21/6245 |
| 2021/0124920 A1 | 4/2021 | Stahfeld | |
| 2021/0383113 A1* | 12/2021 | Stahlfeld | G06V 20/52 |

OTHER PUBLICATIONS

Diana Sadykova, "IN-YOLO: Real-Time Detection of Outdoor High Voltage Insulators Using UAV Imaging", IEEE Transactions on Power Delivery, vol. 35, No. 3, Jun. 2020, pp. 1599-1600.*

Juntao Yang, "Voxel-Based Extraction of Transmission Lines From Airborne LiDAR Point Cloud Data", IEEE Journal of Selected Topics in Applied Earth Observations and Remote Sensing, vol. 11, No. 10, Oct. 2018, pp. 3892-3902.*

Xian Tao, "Detection of Power Line Insulator Defects Using Aerial Images Analyzed With Convolutional Neural Networks", IEEE Transactions on Systems, Man, and Cybernetics: Systems, vol. 50, No. 4, Apr. 2020, pp. 1486-1492.*

Kun Zheng, "Using Vehicle Synthesis Generative Adversarial Networks to Improve Vehicle Detection in Remote Sensing Images," Sep. 4, 2019, IEEE Transactions on Power Delivery, ISPRS Int. J. Geo-Inf. 2019, 8, 390; pp. 1-9.*

Aytar et al., "Cross-modal scene networks," arXiv, Oct. 27, 2016, 11 pages.

Bousmalis et al., "Unsupervised pixel-level domain adaptation with generative adversarial networks," CVPR, 2017, 10 pages.

Brislin et al., "Back-translation for cross-cultural research," Journal of Cross-Cultural psychology, 1970, 33 pages.

Chang et al., "Real-time segmentation of various insulators using generative adversarial networks," IET Comput. Vis., Feb. 2018, 12(5):596-602.

Efros et al., "Texture synthesis by non-parametric sampling," IEEE International Conference on Computer Vision, Sep. 1999, 6 pages.

Gao et al., "Insulator Segmentation for Power Line Inspection Based on Modified Conditional Generative Adversarial Network," Journal Sensors, Nov. 2019, 4245329:1-8.

Gatys et al., "Image style transfer using convolutional neural networks," CVPR, 2016, 10 pages.

Gatys et al., "Preserving color in neural artistic style transfer," arXiv, Jun. 19, 2016, 8 pages.

Godard et al., "Unsupervised monocular depth estimation with left-right consistency," CVPR, 2017, 10 pages.

Goodfellow et al., "Generative Adversarial Nets," NIPS, 2014, 9 pages.

He et al., "Dual learning for machine translation," NIPS, 2016, 9 pages.

Hertzmann et al., "Image Analogies," New York University, 2001, 14 pages.

Huang et al., "Consistent shape maps via semidefinite programming," Symposium on Geometry Processing, Computer Graphics Forum 2013, 2013, 27 pages.

International Preliminary Report on Patentability International Appln. No. PCT/US2020/057538, dated May 12, 2022, 13 pages.

Isola et al., "Image-to-Image translation with conditional adversarial networks," CVPR, 2017, 10 pages.

Johnson et al., "Perceptual losses for real-time style transfer and super-resolution," ECCV, 2016, 17 pages.

Juntao Yang, "Voxel-Based Extraction of Transmission Lines From Airborne UDAR Point Cloud Data," IEEE Journal of Selected Topics in Applied Earth Observations and Remote Sensing, Oct. 2018, 11(10):3892-3902.

Kalal et al., "Forward backward error: automatic detection of tracking failures," ICPR, 2010, 4 pages.

Karacan et al., "Learning to generate images of outdoor scenes from attributes and semantic layouts," arXiv, Dec. 1, 2016, 15 pages.

Kingma et al., "Auto-encoding variational bayes," ICLR, May 2014, 14 pages.

Liu et al., "Coupled generative adversarial networks," NIPS, 2016, 9 pages.

Liu et al., "Unsupervised image-to-image translation networks," NIPS, 2017, 9 pages.

Long et al., "Fully convolutional networks for semantic segmentation," CVPR, 2015, 10 pages.

Nguyen, "Automatic autonomous vision-based power line inspection: A review of current status and the potential role of deep learning," Electrical Power and Energy Systems, 2018, 99:107-120.

PCT International Search Report and Written Opinion in International Appln. No. PCT/US2020/057538, dated Oct. 27, 2020, 20 pages.

PCT Invitation to Pay Additional Fees in International Appln. No. PCT/US2020/057538, dated Feb. 5, 2021, 16 pages.

Ren et al., "Faster R-CNN: Towards Real-Time Object Detection with Region Proposal Networks," IEEE Transaction on Pattern Analysis and Machine Intelligence 39, 2015, 9 pages.

Rosales et al., "Unsupervised image translation," ICCV, 2003, 7 pages.

Sadykova et al., "IN-YOLO: Real-Time Detection of Outdoor High Voltage Insulators Using UAV Imaging," IEEE Transactions on Power Delivery, Jun. 2020, 35(3):1599-1601.

Sangkloy et al., "Scribbler: Controlling Deep Image Synthesis with Sketch and Color," CVPR, 2017, 10 pages.

Shrivastava et al., "Learning from simulated and unsupervised images through adversarial training," CVPR, 2017, 10 pages.

Sundaram et al., "Dense point trajectories by gpu-accelerated large displacement optical flow," ECCV, Jul. 1, 2010, 17 pages.

Taigman et al., "Unsupervised Cross-Domain Image Generation," ICLR, Nov. 7, 2016, 14 pages.

Twain et al., "The Jumping Frog: in English, then in French, and then Clawed Back in a Civilized Language Once More by Patent, Unremunerated Toil," 1903, 104 pages.

Ulyanov et al., "Instance normalization: the missing ingredient for fast stylization," arXiv, Nov. 6, 2017, 6 pages.

Wang et al., "Enhancing Pix2Pix for Remote Sensing Image Classification," 24th International Conference on Pattern Recognition (ICPR), Aug. 20, 2018, 5 pages.

Wang et al., "Image cosegmentation via consistent functional maps," ICCV, 2013, 8 pages.

Xian Tao, "Detection of Power Line Insulator Defects Using Aerial Images Analyzed With Convolutional Neural Networks," IEEE Transactions on Systems, Man, and Cybernetics: Systems, Apr. 2020, 50(4):1486-1492.

Xiang et al., "Mini-Unmanned Aerial Vehicle-Based Remote Sensing: Techniques, Applications, and Prospects," Journal of Latex Class Files, Dec. 2018, 14(8):1-28.

Yi et al., "Dualgan: Unsupervised dual learning for image-to-image translation," ICCV, 2017, 9 pages.

Zach et al., "Disambiguating visual relations using loop constraints," CVPR, 2010, 8 pages.

Zhou et al., "Flowweb: Joint image set alignment by weaving consistent, pixel-wise correspondence," CVPR, 2015, 10 pages.

Zhou et al., "Learning dense correspondence via 3dD-guided cycle consistency," CVPR, 2015, 10 pages.

(56) References Cited

OTHER PUBLICATIONS

Zhu et al., "Unpaired Image-to-Image Translation using Cycle-Consistent Adversarial Networks," IEEE International Conference on Computer Vision, 2017, 18 pages.

* cited by examiner

IMAGE TRANSLATION FOR IMAGE RECOGNITION TO COMPENSATE FOR SOURCE IMAGE REGIONAL DIFFERENCES

CROSS REFERENCE TO RELATED APPLICATIONS

This application is a continuation of U.S. application Ser. No. 17/458,095, filed on Aug. 26, 2021, which is a continuation of U.S. application Ser. No. 16/666,304, filed on Oct. 28, 2019, issued as U.S. Pat. No. 11,126,843 on Sep. 21, 2021. The disclosures of the prior applications are considered part of and are incorporated by reference in the disclosure of this application.

BACKGROUND

This specification relates to determining geographical locations of electric utility grid assets from images.

Electric utility assets include, for example, electrical lines and poles, including associated utility equipment that is mounted atop the poles, e.g., crossarms, transformers, and switches. Determining geographical locations of the utility assets is a process of detection and recognition from images that are taken of areas that show these utility assets.

For a variety of reasons, utility companies too often do not have good information about where their utility assets are located.

SUMMARY

This specification describes technologies for predicting locations of electric utility assets from image data which can be, for example, satellite, aerial, drone, or street-level image data.

When in use, the technologies normalize images taken of areas across multiple geographical regions into images normalized to areas in a particular geographical region. The normalized images are processed by an object detection model that has been trained specifically on images collected in the particular geographical region. Normalizing images is done using one or more generative adversarial networks that are each configured to process images taken of areas in one of the multiple geographical regions and to generate from them corresponding normalized images.

The subject matter described in this specification can be implemented in particular embodiments so as to realize one or more of the following advantages. First, because training data for use in training the generative adversarial network does not have to be labeled, overall consumption of human resources required for manually labeling the training data can be limited to the portion of the training data that corresponds to the particular region. Second, good results are achieved detecting and recognizing electric utility assets shown in image data collected in a wide range of geographical regions, even when the object detection model has not been trained on training data collected in those regions. Third, the technologies allow the use of an object detection model to be scalably and accurately extended to a new geographic region without requiring the use of labeled training data for the new region.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
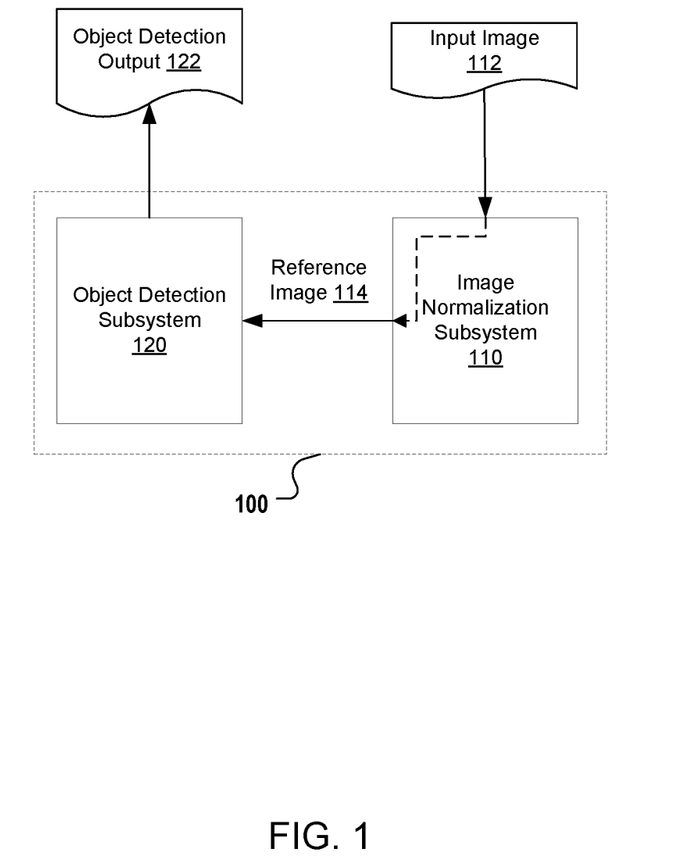
FIG. 1 is a block diagram of an example system for detecting one or more objects in an input image.

FIG. 1 is a block diagram of an example system 100 for detecting one or more objects in an input image. The system 100 is implemented as computer programs on one or more computers in one or more locations, in which the systems, components, and techniques described in this specification are implemented.

The system 100 includes an image normalization subsystem 110 and an object detection subsystem 120. These subsystems include machine learning models that are trained by an image normalization training engine, and an object detection training engine, respectively.

Operating in production, the object detection subsystem 120 receives an input image 112, and processes the input image using an object detection model to generate an object detection output 122. The output includes bounding box data that defines one or more bounding boxes within the input image. Each bounding box represents a corresponding portion of the image that the object detection subsystem has identified as likely containing a particular object. Optionally, the output includes object classification data that defines, for each of the bounding boxes, a classification of the particular object, as determined by the subsystem. Further optionally, the output includes a confidence score for each of the bounding boxes that represents either a likelihood that the bounding box contains an image of the particular object, a likelihood that the particular object belongs to the determined classification, or both.

The object detection model included in the object detection subsystem can be implemented, for example, as a neural network, a support vector machine (SVM) model, a scale-invariant feature transform (SIFT) model, a histogram of oriented gradients (HOG) model, or as any other type of trainable machine learning model.

As a particular example, the object detection model may be a trained convolutional neural network, i.e., a neural network that has multiple layers, including one or more convolutional layers, each layer having a plurality of parameters. Each layer of the neural network generates an output from a received input in accordance with current values of the parameters. The outputs of lower level layers are used to construct the inputs of higher level layers. A suitable convolutional neural network for detecting and classifying objects in an input image is described in more detail in Ren et al., Faster R-CNN: Towards Real-Time Object Detection with Region Proposal Networks, IEEE Transactions on Pattern Analysis and Machine Intelligence 39 (2015): 1137-1149.

Figure 2:
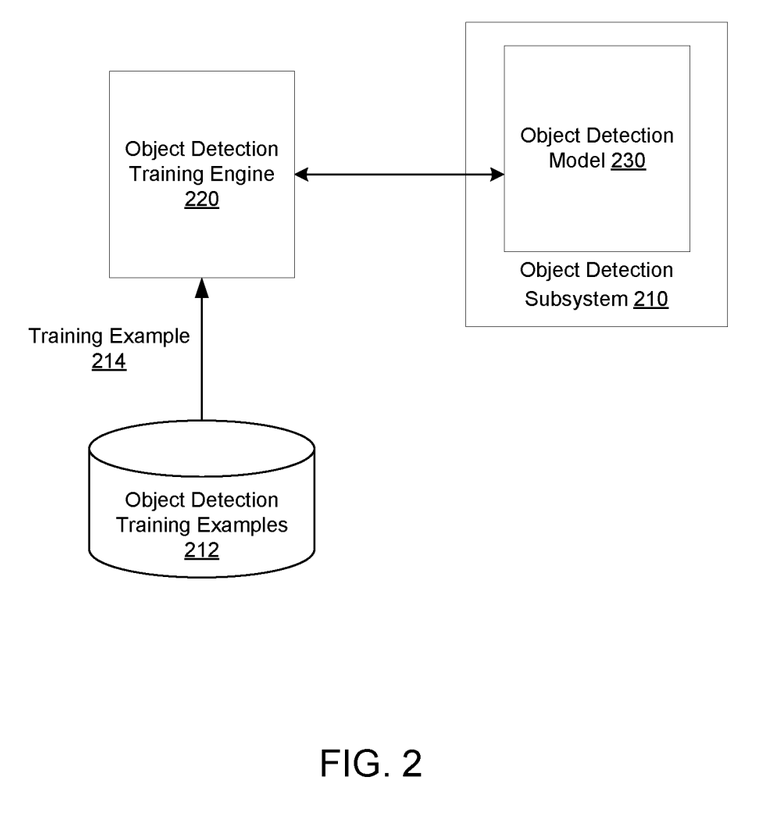
FIG. 2 is a block diagram of an example object detection subsystem in relation to an example training engine.

FIG. 2 is a block diagram of an example object detection subsystem 210 in relation to an example training engine 220. The object detection subsystem and training engine are examples of systems implemented as computer programs on one or more computers in one or more locations in which the systems, components, and techniques described below are implemented.

Specifically, FIG. 2 shows the object detection subsystem in interaction with the object detection training engine, which trains the object detection model 230 using an appropriate machine learning training technique, e.g., stochastic gradient descent or adaptive moment estimation. The object detection training engine trains the model on a set of object detection training examples 212 in order to determine trained values of the parameters of the model. Each such training example 214 includes a training image associated with corresponding ground truth label data that defines respective locations and classifications of one or more objects in the training image. For example, the ground truth label data includes data defining one or more bounding boxes within the training image that each include an image of a respective object. In this example, the ground truth label data may further include, for each of the one or more bounding boxes, data defining a classification of the object. The classification can be, for example, a type, a class, a group, a category, or an operating condition.

In order to train the object detection model on a given training image, the object detection training engine provides the given training image to the object detection model and obtains from the object detection model an object detection training output for the given training image. The object detection training output includes data defining respective predicted locations and classifications of one or more objects in the training image.

The object detection training engine computes a value of an objective function that measures a difference between the object detection training output and the ground truth label data associated with the given training image. The training engine then updates, using an appropriate machine learning training technique, e.g., stochastic gradient descent or adaptive moment estimation, the current values of the parameters within the object detection model based on a computed gradient of the objective function.

After training has completed, during the production, the object detection subsystem can use the trained model to perform any of a variety of tasks relating to images that involve either object detection, object classification, or both. As a particular example, the trained object detection model can detect electric utility assets depicted in various input images, including satellite imagery, aerial imagery, i.e., photographs taken from an aircraft, possibly a drone, street-level imagery, i.e., images captured near ground level, and so on. The electric utility assets may include, for example, electrical lines and utility poles, including associated electric utility equipment that is mounted atop utility poles, e.g., crossarms, transformers, switches, insulators, reclosers, sectionalizers, capacitor banks, including switched capacitors, load tap changers, taps, and the like.

Following the example above, in some implementations, the object detection subsystem can further detect operating conditions of the detected electric utility assets. For example, the subsystem can detect whether the switches on utility poles are in an open or closed position. As another example, the subsystem can detect if any electrical lines are broken. Such implementations can be used to assist field personnel in performing routine inspection and emergency response tasks related to utility infrastructure.

Training an object detection model to accurately detect and classify electric utility assets and, in particular, electric utility asset operating conditions, can be a lengthy and costly process. First, to ensure quality of the training process, the object detection training examples include high-resolution images. Each pixel in a high-resolution image typically corresponds to a small area in real world, e.g., a 1 m by 1 m area, or a 10 cm by 10 cm area, for example.

Second, in some cases, each such training image is labeled with high-quality labels. Specifically, the labels correspond to validated, specific human annotations which may include, for example, locations of utility poles, configurations of equipment atop the poles, and so on.

Typically, training datasets that include both high-resolution images and high-quality labels are very expensive to obtain. In addition, training an object detection model on such training dataset consumes large amounts of computational and other resources.

After training has completed, however, if provided with input images that are taken of an area in a geographical region that is different from the geographical region within which the training images were taken, the object detection model is likely produce a higher number of errors, i.e., false positive or false negative errors, when performing electric utility assets detection and classification. In other words, after being trained, the subsystem implementing the object detection model may not achieve optimal performance on detecting and classifying electric utility assets depicted in the input image when the input images and training images are not collected in a same geographical region.

In some cases, this is because the visual features that are depicted in images of different regions have distinctive characteristics. The differences between these visual features in turn confuse the trained object detection model and worsen its performance during production. For example, landform, vegetation, and architecture in different regions may look different. For example, the vegetation depicted in a Canada-based aerial image may largely belong to maple trees, whereas the vegetation depicted a United States-based aerial image may largely belong to sycamore trees, which differ from maple trees in some visual features, including color and texture. Additionally, the electric utility assets in different regions may look different, for example, due to regional variations in infrastructure designs.

For brevity, the techniques described in this specification will be described as relating issues caused by differences between geographical features in images. It should be noted that, in fact, the techniques apply to issues caused by differences between any other visual features in images, including seasonal features, e.g., using images from only one season for training and images from other seasons in production.

In order to ensure a satisfying performance of the subsystem on detecting electric utility assets depicted in images collected in a variety of regions, a common approach would be to train the model on large amounts high-resolution training images that are each labeled with high-quality labels and that are collected in all corresponding regions. However, as explained above, the labeling and training processes can be both costly and time consuming.

Therefore, as shown in FIG. 1, the system 100 applies image normalization before performing the object detection task on input images. Doing so allows a shorter labeling process to be used while ensuring a satisfying performance on object detection and classification tasks.

During production, the system 100 may receive an input image 112 that is collected in an area of a first geographical region. The system includes an object detection model that is trained specifically on training images collected in a second geographical region. The system processes the input image to generate a reference image 114 which has the regional features that belong to images collected in the second geographical region while keeping respective classifications and locations of any electric utility assets depicted in the input image unaltered. The system then proceeds to identify locations and classifications of electric utility assets shown in the reference image.

More specifically, the image normalization subsystem 110 is configured to receive an input image of an area in the first geographical region. The image normalization subsystem generates a corresponding reference image based on processing the input image using an image normalization network in accordance with current values of the network parameters. The reference image shows an area of the second geographical region. The system then submits the reference image to the object detection subsystem 120. Upon receiving the reference image, the object detection subsystem proceeds to process the received reference image using the object detection model to generate object detection output 122. The output includes data that defines locations and classifications of one or more electric utility assets shown in the reference image.

In some implementations, the image normalization subsystem includes at least one image normalization neural network that is implemented as a generative adversarial network (GAN), or more specifically, a cycle-consistent generative adversarial network (CycleGAN). Such a network is described in more detail in Zhu et al., Unpaired Image-to-Image Translation using Cycle-Consistent Adversarial Networks, IEEE International Conference on Computer Vision (ICCV), 2017.

Training the image normalization neural network included in the image normalization subsystem will be described in more detail below.

Figure 3:
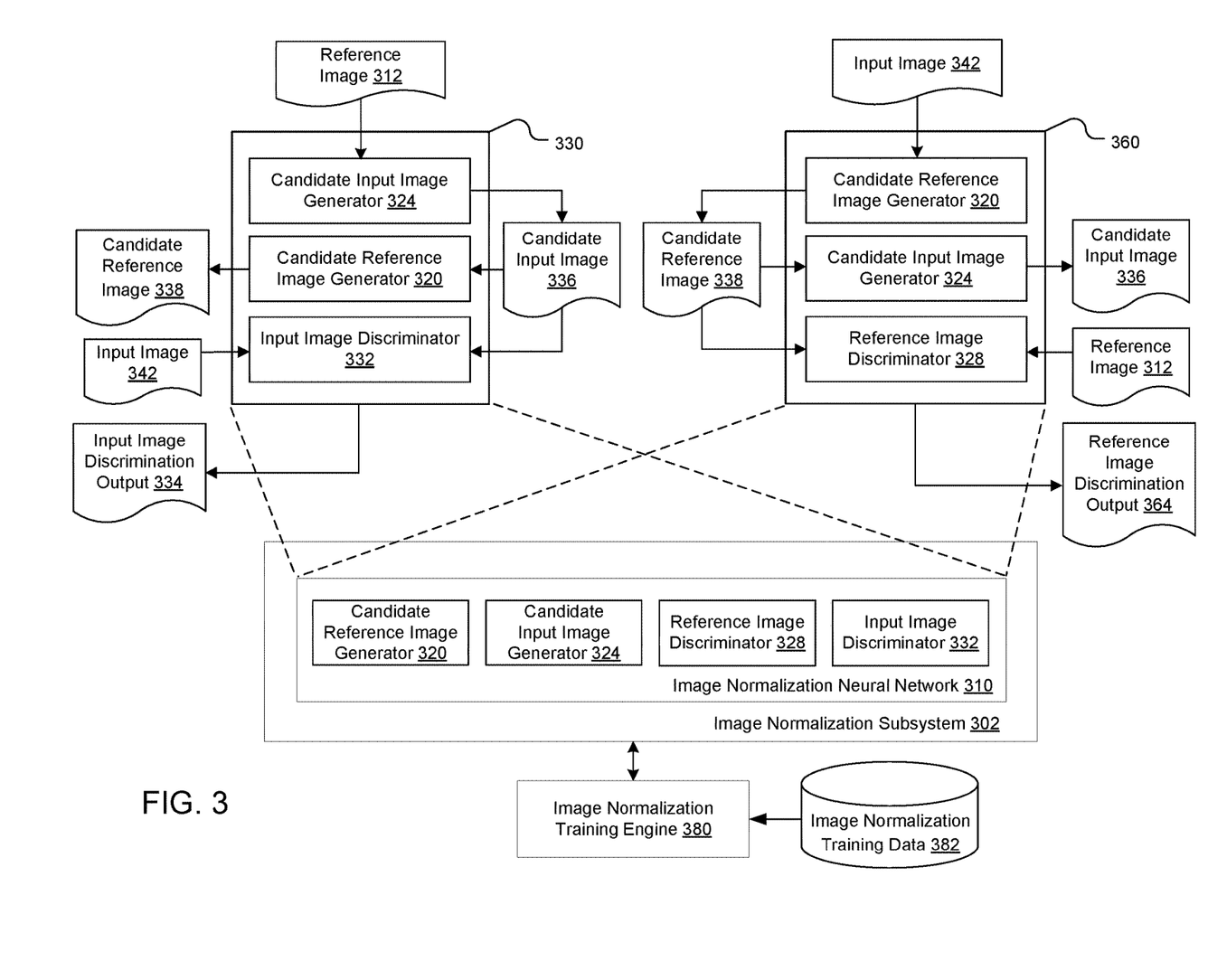
FIG. 3 is a block diagram showing an example image normalization subsystem in relation to an example training engine.

FIG. 3 is a block diagram showing an example image normalization subsystem 302 in relation to an example training engine 380. The image normalization subsystem and training engine are examples of systems implemented as computer programs on one or more computers in one or more locations in which the systems, components, and techniques described below are implemented.

Specifically, FIG. 3 shows the image normalization subsystem 302 in the context of training, during which the image normalization training engine trains the training image normalization neural network 310 included in the image normalization subsystem using appropriate training techniques, e.g., adaptive moment estimation, stochastic gradient descent, and the like. More specifically, the image normalization training engine trains the network on image normalization training data 382 in order to determine trained values of the parameters within the network.

The training data includes (i) a plurality of input images that are collected in a first geographical region and (ii) a plurality of reference images that are collected in a second geographical region. Each reference image generally includes one or more regional features of the second geographical region that are not present in the first geographical region, or features that are not present in the same form. For example, the input images of the first geographical region may depict buildings mostly having terracotta roof tiles, while the reference images of the second geographical region may depict buildings mostly having slate roof tiles. As another example, the input images may mostly depict evergreen plants, while the reference images may mostly depict deciduous plants. As yet another example, the input images may depict utility poles mostly made of wood, while the reference images may depict utility poles mostly made of concrete.

Optionally, each image is associated with an identity label to indicate that the image is in fact included in the training data.

Moreover, there may or may not exist a mapping relationship between the input and reference images. That is, for certain electric utility assets and background objects that are depicted in any one of the plurality of input images, there may or may not exist an image in the plurality of reference images that depicts the same electric utility assets and background objects.

The training data further includes, for some or all of the plurality of reference images, corresponding ground truth label data that defines respective locations, and, optionally, classifications of one or more electric utility assets shown in these reference images.

In general, the image normalization neural network includes four components: (i) the candidate reference image generator 320 that is configured to generate candidate reference images 338 based on either processing input images 342 or candidate input images 336, (ii) the candidate input image generator 324 that is configured to generate candidate input images 336 based on processing either reference images 312 or candidate reference images 338, (iii) the reference image discriminator 328 that generates corresponding candidate labels for reference images 312 and candidate reference images 338, and (iv) the input image discriminator 332 that generates corresponding candidate labels for input images 342 and candidate input images 336. The labels can be binary, but in some implementations, each candidate label includes a confidence score representing a likelihood of the identity of an image, as determined by the corresponding discriminator. For example, a confidence score close to 1 indicates that the image is an input image that is from the training data, while a confidence score close to 0 indicates that the image is a candidate input image that is generated by the candidate input image generator.

Although being named differently, each generator and discriminator is in fact a neural network, or, at least a portion of a neural network, with multiple network layers whose corresponding parameter values can be determined during the training. In some implementations, each generator and discriminator is a respective convolutional neural network.

During training, the training engine alternates between training different components of the image normalization neural network. Specifically, the training engine alternates between training the first subnetwork 330 and the second subnetwork 360. While being illustrated as logically separated, subnetworks 330 and 360 in fact generally include certain common network components, e.g., the candidate reference image generator and candidate input image generator.

The first subnetwork is configured to obtain a reference image, process the reference image using the candidate input image generator to generate a candidate input image, and to process the candidate input image using the candidate reference image generator to generate a candidate reference image. In addition, the first subnetwork uses the input image discriminator to predict an identity of the generated candidate input image, e.g., by comparing it with a corresponding input image.

Similarly, the second subnetwork is configured to obtain an input image, process the input image using the candidate reference image generator to generate a candidate reference image, and to process the candidate reference image using the candidate input image generator to generate a candidate input image. The second subnetwork uses the reference image discriminator to predict an identity of the generated candidate reference image, e.g., by comparing it with a corresponding reference image.

Typically, the process performed by either the first or the second subnetwork may be referred to as a cyclic process, i.e., a process to generate candidate input or reference images based on corresponding input or reference images. The training engine trains each subnetwork so that it can generate candidate input or reference images that look as similar to actual input or reference images as possible.

The training engine trains each pair of generator and discriminator so that the generators can generate candidate input and reference images whose identities can be respectively determined by discriminators as input and reference images that are from the training data.

Figure 4:
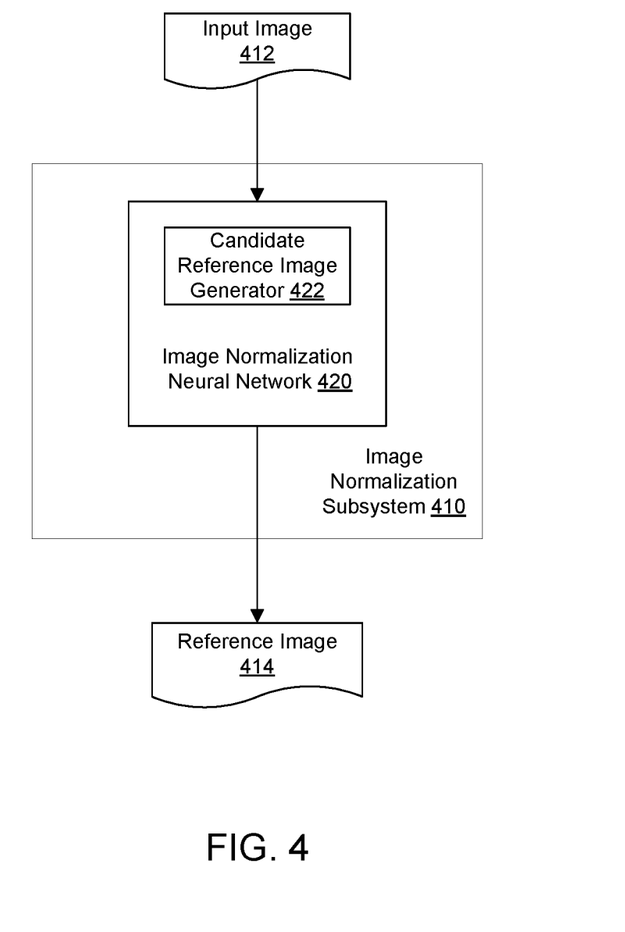
FIG. 4 is a block diagram of an example image normalization subsystem in production.

FIG. 4 is a block diagram of an example image normalization subsystem 410 in production. The image normalization subsystem 410 can be implemented as computer programs on one or more computers in one or more locations in which the systems, components, and techniques described below are implemented.

During production, the image normalization subsystem receives an input image 412 and processes the received input image using the image normalization neural network 420. In some implementations, the image normalization neural network uses only some components, specifically the candidate reference image generator 422, of the neural network to process the received input image and to generate a reference image 414. The subsystem is further configured to submit, e.g., over a data communication network or a direct connection, or in a batch of images, the reference image to the object detection subsystem 120 in FIG. 1.

Figure 5:
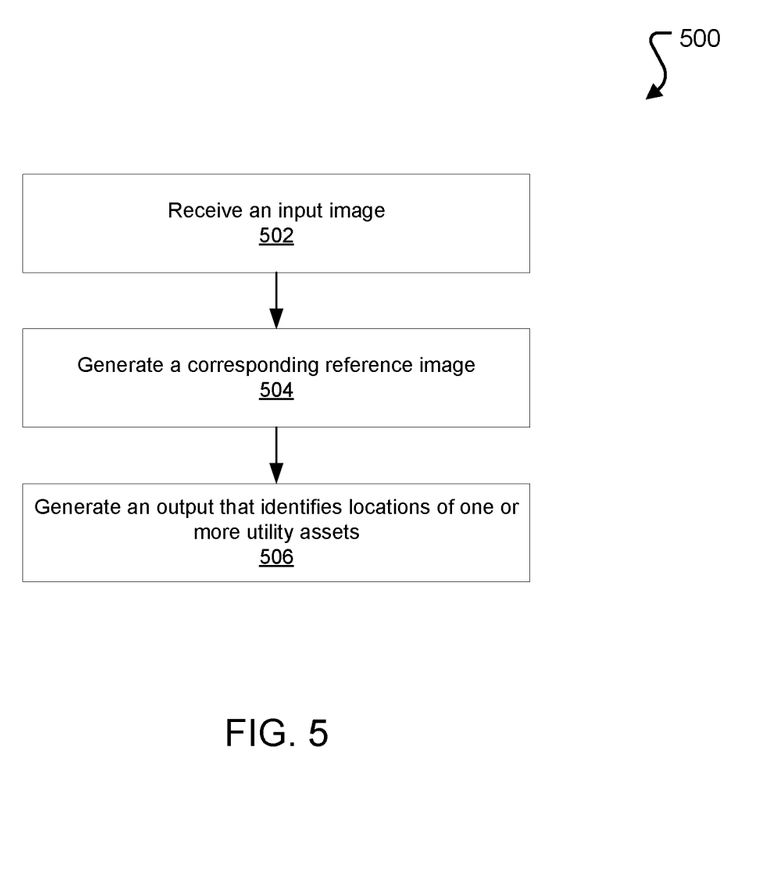
FIG. 5 is a flow diagram of an example process for performing object detection.

FIG. 5 is a flow diagram of an example process 500 for performing object detection. For convenience, the process 500 will be described as being performed by a system of one or more computers located in one or more locations. For example, a system for detecting one or more objects in an input image, e.g., the detection system 100 of FIG. 1, appropriately programmed in accordance with this specification, can perform the process 500.

The system receives an input image (502) of an area in a first geographical region. The input image will generally include one or more regional features of the first geographical region that are not present in a different, second geographical region. The input image generally shows electric utility assets that are present in the area.

The system generates a corresponding reference image (504) using a generative adversarial network that has been trained using techniques that are described in more detail below with reference to FIGS. 6-7. In some implementations, the system selects the generative adversarial network from a plurality of generative adversarial networks that correspond to different geographical regions, i.e., that have each been trained on respective training data including images collected in a different particular geographical region. The reference image shows regional features that belong to images collected in the second geographical region. The reference image also preserves respective classifications and locations of any electric utility assets that are present in the input image.

The system generates an output that identifies locations of one or more utility assets (506). Specifically, the system generates the asset-identification output by processing the reference image using an object detection subsystem that includes an object detection model that has been trained specifically on images collected in the second geographical region.

In some implementations, the system generates bounding box data that specifies the locations of assets with respect to the generated reference image. In some other implementations, the system generates bounding box data that specifies the locations of assets with respect to the input image. Each bounding box, defined either within the reference image or the input image, represents a corresponding portion of the image that the object detection subsystem has identified as likely containing a particular utility asset. The bounding box data can be embedded in image data, e.g., incorporated in a copy of the input image, or it can be in a separate data entity, e.g., a text file or comma-separated values file.

Figure 6:
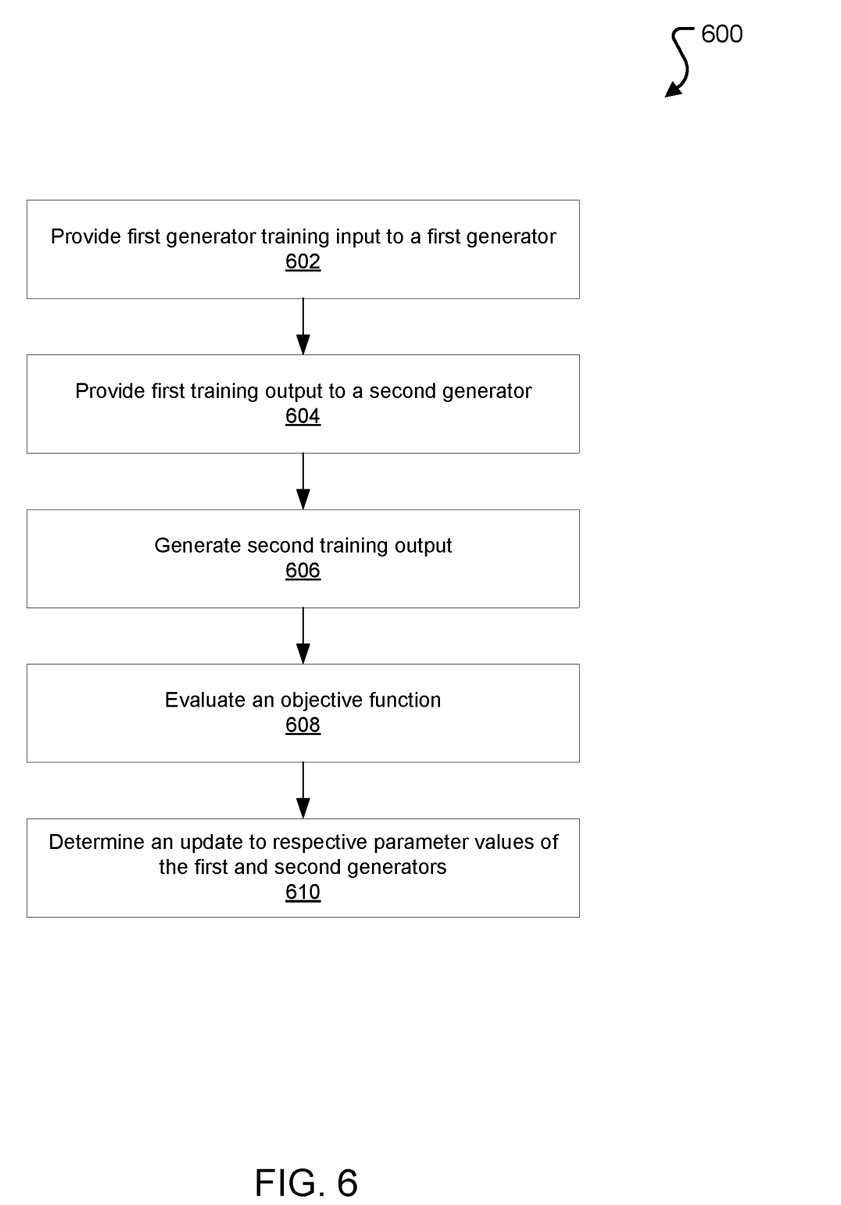
FIG. 6 is a flow diagram of an example process for training an image normalization network.

FIG. 6 is a flow diagram of an example process 600 for training an image normalization network. For convenience, the process 600 will be described as being performed by a system of one or more computers located in one or more locations. For example, a system that includes an image normalization subsystem and a corresponding training engine, e.g., a system that includes the image normalization subsystem 110 and the training engine 380 of FIG. 3, appropriately programmed in accordance with this specification, can perform the process 600.

The system can repeatedly perform the process 600 for different reference images included in the image normalization training data in order to train the image normalization network by repeatedly updating the values of the network parameters.

Alternatively, the system can repeatedly perform the process 600 for each entire batch of different reference images. Each batch generally includes a fixed number of different reference images, e.g., 14, 64, or 256. In other words, the system combines respective updates that are determined during the fixed number of iterations of process 600 and proceeds to update the network parameter values based on the combined update.

The system provides first generator training input to a first generator (602). The first generator training input includes one or more reference images that show utility assets. Specifically, the system processes the first generator training input in accordance with current parameter values of the first generator to generate first training output.

The system provides the first training output to a second generator (604). The first training output includes candidate input images. In some implementations, each candidate input image corresponds to a respective reference image. That is, the system generates a corresponding candidate input image for each reference image included in the first generator training input.

The system generates second training output (606) that includes candidate reference images. Some or all of the candidate reference images show utility assets. Specifically, the system generates the second training output based on processing the first training output in accordance with current parameter values of the second generator. In some implementations, the system generates a corresponding candidate reference image for each candidate input image included in the first training output.

The system evaluates an objective function (608). In particular, the objective function is a first cycle-consistency objective function that evaluates a measure of difference between the first generator training input and the second training output. As will be described in more detail below with reference to FIG. 7, the system evaluates a measure of difference between respective identified utility assets shown in corresponding pairs of reference image and candidate reference image.

In some implementations, when evaluating the first cycle-consistency objective function, the system also evaluates a measure of difference between the pair of reference image and candidate reference image. For example, for each pair of images, the system evaluates the measure of difference based on computing a mean squared error between the two images, or more precisely, respective data representing the two images.

The system determines an update to current parameter values of the first and second generators (610) by determining a gradient of the first cycle-consistency objective function with respect to respective network parameters.

The process 600 described above generally corresponds to a first cyclic process of the overall image normalization network training procedure, i.e., training the network to reproduce the original reference images. Similarly, in a second cyclic process, the system also trains the network to reproduce the original input images.

More specifically, the system provides second generator training input which includes input images to the second generator. The system provides third training output generated by the second generator to the first generator. The third training output includes candidate reference images each corresponding to a respective input image. The system uses the first generator to generate fourth training output from the third training output. In some implementations, the first generator generates a respective candidate input image for each candidate reference image. The fourth training output includes candidate input images.

The system evaluates a second cycle-consistency objective function including evaluating respective measures of difference between corresponding pairs of input image and candidate input image. The system determines another update to respective parameter values of the first and second generators based on computing a gradient of the second cycle-consistency objective function.

In some implementations, the system then proceeds to update the current parameter values of the first and second generators using an appropriate machine learning training technique, e.g., adaptive moment estimation or stochastic gradient descent.

In addition, for some or all of the images involved in the cyclic processes, the system trains the network to generate a prediction which identifies each image as being either generated by the network itself or obtained from the training data.

For example, when training the image normalization network, the system uses a first discriminator to predict a corresponding identity of each input image and candidate input image. For example, the first discriminator can generate a first discrimination output that includes a corresponding training score for each image. In this example, a score that is close to one indicates that the first discriminator identifies the image as being obtained from training data, while a score that is close to zero indicates that the first discriminator identifies the image as being generated by the network itself. In a similar manner, the system also uses a second discriminator to predict a corresponding identity of each reference image and candidate reference image.

The system then evaluates respective adversarial objective functions including evaluating corresponding measures of difference between the discrimination output and corresponding ground truth identity of each image. For example, a ground truth score of one is assigned to each image that is associated with an identity label, i.e., image obtained from training data. A ground truth score of zero is then assigned to each image without an identity label, i.e., image generated by the network. For example, the system may evaluate the adversarial objective function by computing a cross-entropy loss which characterizes, for each image, whether the corresponding training score is consistent with the ground truth score.

The system determines an update to respective parameter values of the first and second generators based on computing respective gradients of the adversarial objective functions. The system then proceeds to update the current parameter values of the first and second discriminators using an appropriate machine learning training technique, e.g., adaptive moment estimation or stochastic gradient descent. In general, updating respective parameter values of the discriminators improves the performance of the discriminators on image identity prediction, which in turn drives the generators to learn to more accurately reproduce original images that can "fool" the discriminators.

Figure 7:
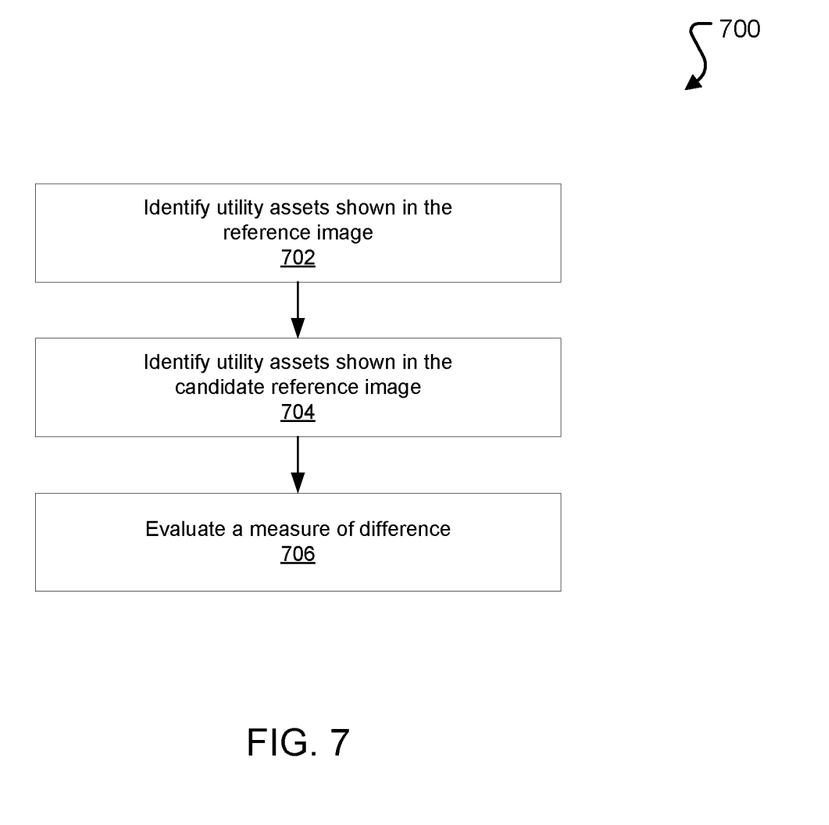
FIG. 7 is a flow diagram of an example process for evaluating the first cycle-consistency objective function.

FIG. 7 is a flow diagram of an example process 700 for evaluating the first cycle-consistency objective function. For convenience, the process 700 will be described as being performed by a system of one or more computers located in one or more locations. For example, a system that includes an object detection subsystem and an image normalization training engine, e.g., a system that includes the object detection subsystem 120 of FIG. 1 and the image normalization training engine 380 of FIG. 3, appropriately programmed in accordance with this specification, can perform the process 700.

In general, the system can repeatedly perform the process 700 for each different pair of reference image and candidate reference image. Alternatively, the system can repeatedly perform the process 700 for each entire batch of different image pairs. Each batch generally includes a fixed number of different pairs of reference image and candidate reference image, e.g., 14, 64, or 256.

The system identifies utility assets shown in the reference image (702). The system may do so by reading ground truth label data that corresponds to the reference image that specifies locations of identified utility assets, by processing the reference image using the object detection model to generate an asset-identification output that specifies locations of respective identified utility assets, or both.

The system identifies utility assets shown in the candidate reference image (704). Specifically, the system processes the candidate reference image using the object detection model to generate an asset-identification output that specifies locations of respective identified utility assets.

The system evaluates a measure of difference (706) between respective identified utility assets shown in the reference and candidate reference image. In general, the measure of difference can be determined using any suitable metric. For example, the system evaluates a measure of difference between respective numbers of the utility assets that are identified in the reference image and the candidate reference image. As another example, the system evaluates a measure of difference between respective locations of the utility assets identified in the reference image and the candidate reference image. In some implementations, the system combines the respective measures of difference to generate a combined measure of difference to be used in evaluating the objective function.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having, or configured to communicate with, a display device, e.g., a LCD (liquid crystal display) or organic light-emitting diode (OLED) monitor, a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

In addition to the embodiments of the attached claims and the embodiments described above, the following numbered embodiments are also innovative:

Embodiment 1 is a method of predicting locations of utility assets, the method comprising: receiving an input image of an area in a first geographical region; generating, from the input image and using a generative adversarial network, a corresponding reference image; and generating, by an object detection model and from the reference image, an output that identifies respective locations of one or more utility assets with reference to the input image.

Embodiment 2 is a method of embodiment 1, wherein generating a reference image further comprises: selecting as the generative adversarial network a network that corresponds to the first geographical region from a plurality of candidate generative adversarial networks that correspond respectively to different geographical regions.

Embodiment 3 is a method of any one of embodiments 1-2, wherein the object detection model is a convolutional neural network that has been trained on training images that are labeled with labels identifying utility assets shown in the training images and that were taken of areas in a second geographical region.

Embodiment 4 is a method of embodiment 3, wherein the input image includes one or more regional features of the first geographical region that are not present in the second geographical region.

Embodiment 5 is a method of any one of embodiments 1-4, wherein the output is incorporated in a copy of the input image.

Embodiment 6 is a method of any one of embodiments 1-4, wherein the output is data separate from the input image.

Embodiment 7 is a method of any one of embodiments 1-6, wherein the input image is a satellite image, an aerial image, a drone image, or a street-level image.

Embodiment 8 is a method of any one of embodiments 1-7, wherein the one or more utility assets comprise a line, a pole, a crossarm, a transformer, a switch, an insulator, a recloser, a sectionalizer, a capacitor bank, including switched capacitors, a load tap changer, or a tap.

Embodiment 9 is a method of any one of embodiments 1-8, wherein the input image shows one or more utility assets in respective locations, and wherein: generating from the input image a corresponding reference image comprises generating the reference image to have respective locations of the one or more utility assets that are the same as the locations of the corresponding utility assets in the input image.

Embodiment 10 is a method of training a generative adversarial network, the network comprising two generators and two discriminators and configured to generate a reference image from an input image, the method comprising: providing first generator training input to a first generator, the first generator training input comprising reference images that show utility assets; providing first training output generated by the first generator to a second generator, the first training output comprising candidate input images, wherein each candidate input image corresponds to a respective reference image; generating by the second generator, from the first training output, second training output, the second training output comprising candidate reference images that show utility assets, wherein the second generator generates a corresponding candidate reference image for each candidate input image; evaluating an objective function of a measure of difference between respective identified utility assets shown in corresponding pairs of reference image and candidate reference image; and determining, based on a determined gradient of the objective function, an update to respective parameter values of the first and second generators.

Embodiment 11 is a method of embodiment 10, wherein evaluating an objective function comprises: for each reference image: obtaining, from corresponding ground truth label data, data that specifies locations of respective identified utility assets shown in the reference image; and for each candidate reference image: generating, by an object detection model and from the candidate reference image, data that specifies locations of respective identified utility assets shown in the candidate reference image.

Embodiment 12 is a method of any one of embodiments 10-11, wherein, for each pair of corresponding images, the measure of difference is calculated from a difference between respective numbers of the utility assets identified in the reference image and the candidate reference image, and from a difference between respective locations of the utility assets identified in the reference image and the candidate reference image.

Embodiment 13 is a method of any one of embodiments 10-12, wherein the generators and discriminators are each a respective convolutional neural network having a plurality of network parameters.

Embodiment 14 is a system comprising one or more computers implementing the method of any one of embodiments 1-13.

Embodiment 15 is a computer storage medium encoded with a computer program, the program comprising instructions that are operable, when executed by data processing apparatus, to cause the data processing apparatus to perform the method of any one of embodiments 1-13.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
receiving an input image of an area in a first geographical region, wherein the input image shows one or more utility assets having respective types of the first geographical region;
generating, from the input image and using an image normalization model, a corresponding reference image, wherein the corresponding reference image (i) keeps visual characteristics of the input image related to the one or more utility assets unmodified, such that the corresponding reference image shows the one or more utility assets as having the same respective types as the one or more utility assets shown in the input image, but (ii) modifies visual characteristics of the input image related to regional features; and
generating, by applying the reference image as input to an operating condition detection model a utility asset operating condition detection output that identifies a detected operating condition of each of the one or more utility assets shown in the input image.

2. The method of claim 1, wherein the image normalization model comprises a generative neural network.

3. The method of claim 2, wherein the generative neural network has been trained to translate images that were taken of areas in the first geographical region into normalized images having similar visual characteristics related to regional features as images that were taken of areas in a second geographical region.

4. The method of claim 3, wherein the visual characteristics related to regional features comprise one or more of: a landform visual characteristic, a vegetation visual characteristic, an architecture visual characteristic, or an infrastructure design visual characteristic.

5. The method of claim 2, wherein the operating condition detection model comprises a neural network that has been trained on training images that were taken of areas in the second geographical region.

6. The method of claim 1, wherein the detected operating condition comprises an open or closed position of a switch on a utility pole.

7. The method of claim 1, further comprising:
generating utility infrastructure maintenance data based on the utility asset operating condition detection output.

8. A system comprising:
at least one processor; and a data store coupled to the at least one processor having instructions stored thereon which, when executed by the at least one processor, causes the at least one processor to perform operations comprising:
receiving an input image of an area in a first geographical region, wherein the input image shows one or more utility assets having respective types of the first geographical region;
generating, from the input image and using an image normalization model, a corresponding reference image, wherein the corresponding reference image (i) keeps visual characteristics of the input image related to the one or more utility assets unmodified, such that the corresponding reference image shows the one or more utility assets as having the same respective types as the one or more utility assets shown in the input image, but (ii) modifies visual characteristics of the input image related to regional features; and
generating, by applying the reference image as input to an operating condition detection model, a utility asset operating condition detection output that identifies a detected operating condition of each of the one or more utility assets shown in the input image.

9. The system of claim 8, wherein the image normalization model comprises a generative neural network.

10. The system of claim 9, wherein the generative neural network has been trained to translate images that were taken of areas in the first geographical region into normalized images having similar visual characteristics related to regional features as images that were taken of areas in a second geographical region.

11. The system of claim 10, wherein the visual characteristics related to regional features comprise one or more of: a landform visual characteristic, a vegetation visual characteristic, an architecture visual characteristic, or an infrastructure design visual characteristic.

12. The system of claim 10, wherein the operating condition detection model comprises a neural network that has been trained on training images that were taken of areas in the second geographical region.

13. The system of claim 8, wherein the detected operating condition comprises an open or closed position of a switch on a utility pole.

14. The system of claim 8, wherein the operations further comprise:
generating utility infrastructure maintenance data based on the utility asset operating condition detection output.

15. A non-transitory computer readable storage medium storing instructions that, when executed by at least one processor, cause the at least one processor to perform operations comprising:
receiving an input image of an area in a first geographical region, wherein the input image shows one or more utility assets having respective types of the first geographical region;
generating, from the input image and using an image normalization model, a corresponding reference image, wherein the corresponding reference image (i) keeps visual characteristics of the input image related to the one or more utility assets unmodified, such that the corresponding reference image shows the one or more utility assets as having the same respective types as the one or more utility assets shown in the input image, but (ii) modifies visual characteristics of the input image related to regional features; and
generating, by applying the reference image as input to an operating condition detection model, a utility asset operating condition detection output that identifies a detected operating condition of each of the one or more utility assets shown in the input image.

16. The non-transitory computer readable storage medium of claim 15, wherein the image normalization model comprises a generative neural network.

17. The non-transitory computer readable storage medium of claim 16, wherein the generative neural network has been trained to translate images that were taken of areas in the first geographical region into normalized images having similar visual characteristics related to regional features as images that were taken of areas in a second geographical region.

18. The non-transitory computer readable storage medium of claim 17, wherein the visual characteristics related to regional features comprise one or more of: a landform visual characteristic, a vegetation visual characteristic, an architecture visual characteristic, or an infrastructure design visual characteristic.

19. The non-transitory computer readable storage medium of claim 17, wherein the operating condition detection model comprises a neural network that has been trained on training images that were taken of areas in the second geographical region.

20. The non-transitory computer readable storage medium of claim 15, wherein the operations further comprise:
   generating utility infrastructure maintenance data based on the utility asset operating condition detection output.

* * * * *